United States Patent
Gillis et al.

(10) Patent No.: US 12,434,772 B2
(45) Date of Patent: Oct. 7, 2025

(54) VEHICLE HOOD LATCH RELEASE SYSTEM AND METHOD

(71) Applicant: Ford Global Technologies, LLC, Dearborn, MI (US)

(72) Inventors: Francis Raymond Gillis, Farmington Hills, MI (US); David Alexander Goff, Detroit, MI (US); Ciprian Ioan Codea, Belle River (CA); Kosta Papanikolaou, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/473,523

(22) Filed: Sep. 25, 2023

(65) Prior Publication Data

US 2024/0010280 A1    Jan. 11, 2024

Related U.S. Application Data

(62) Division of application No. 16/782,472, filed on Feb. 5, 2020, now Pat. No. 11,801,900.

(51) Int. Cl.
*E05B 83/24*  (2014.01)
*B62D 25/12* (2006.01)
(Continued)

(52) U.S. Cl.
CPC .............. *B62D 25/12* (2013.01); *E05B 77/54* (2013.01); *E05B 79/20* (2013.01); *E05B 81/04* (2013.01);
(Continued)

(58) Field of Classification Search
CPC .......... E05B 83/16; E05B 83/18; E05B 83/24; E05B 83/243; E05B 83/26; E05B 81/04;
(Continued)

(56) References Cited

U.S. PATENT DOCUMENTS

| | | |
|---|---|---|
| 4,831,356 A | 5/1989 | Ito |
| 5,605,363 A | 2/1997 | Kapes |
| 5,666,834 A | 9/1997 | Inoue |
| 5,715,713 A | 2/1998 | Aubry et al. |
| 6,123,371 A | 9/2000 | Fisher |
| 7,341,289 B2 | 3/2008 | Schretzlmeier et al. |
| 8,798,858 B2 | 8/2014 | Zysk |

(Continued)

FOREIGN PATENT DOCUMENTS

| DE | 19650928 A1 | 6/1998 |
|---|---|---|
| DE | 202013105314 U1 | 1/2014 |

(Continued)

*Primary Examiner* — Alyson M Merlino
(74) *Attorney, Agent, or Firm* — Vichit Chea; Carlson, Gaskey & Olds, P.C.

(57) ABSTRACT

A hood latch release system includes, among other things, a release handle within a compartment covered by a hood, a hood latch assembly, and a release assembly having an electrically powered actuator and a mechanical actuator. The electrically powered actuator and the mechanical actuator are each configured to move one or more latches of the hood latch assembly from the latched position to the unlatched position. The system further includes a selector assembly. When a coupling member of the selector assembly is in a decoupling position, actuating the release handle causes the electrically powered actuator to unlatch the primary latch, the secondary latch, or both. When the coupling member of the selector assembly is in a coupling position, actuating the release handle causes the mechanical actuator to unlatch the primary latch, the secondary latch, or both.

10 Claims, 8 Drawing Sheets

(51) Int. Cl.
*E05B 77/54* (2014.01)
*E05B 79/20* (2014.01)
*E05B 81/04* (2014.01)
*E05B 81/16* (2014.01)
*E05B 85/10* (2014.01)

(52) U.S. Cl.
CPC ............ *E05B 81/16* (2013.01); *E05B 83/243* (2013.01); *E05B 85/10* (2013.01)

(58) Field of Classification Search
CPC .......... E05B 81/02; E05B 81/16; E05B 81/05; E05B 81/08; E05B 81/30; E05B 81/42; E05B 81/44; E05B 81/46; E05B 81/48; E05B 81/50; E05B 81/90; E05B 81/25; E05B 79/20; E05B 79/22; E05B 77/54
See application file for complete search history.

(56) References Cited

U.S. PATENT DOCUMENTS

| | | | |
|---|---|---|---|
| 9,163,435 | B2 | 10/2015 | Zysk et al. |
| 9,777,516 | B2 | 10/2017 | Farooq et al. |
| 2019/0128028 | A1 | 5/2019 | Herline et al. |
| 2019/0211590 | A1 | 7/2019 | Tieman |
| 2019/0351952 | A1 | 11/2019 | Hunt |

FOREIGN PATENT DOCUMENTS

| | | |
|---|---|---|
| DE | 102018001021 | 8/2019 |
| EP | 1111173 A2 | 6/2001 |
| GB | 2285476 A | 7/1995 |
| GB | 2562294 A | 11/2018 |
| KR | 2011137992 A | 12/2011 |
| WO | 9849417 A1 | 11/1998 |
| WO | 2018033611 A1 | 2/2018 |

VEHICLE HOOD LATCH RELEASE SYSTEM AND METHOD

CROSS-REFERENCE TO RELATED APPLICATION

This application is a divisional of U.S. patent application Ser. No. 16/782,472, which was filed on Feb. 5, 2020, and is incorporated herein by reference.

TECHNICAL FIELD

This disclosure relates generally to releasing a hood latch assembly of a vehicle and, more particularly, to ensuring that the hood latch assembly can fully release the hood when the vehicle lacks power.

BACKGROUND

Vehicles are increasingly utilizing alternate propulsion systems. The alternate propulsion systems may be positioned within the vehicle such that a storage area can be provided at a front of the vehicle. A hood latch assembly can be used to secure a front hood that covers such a storage area. A hood latch assembly can also be used to secure a rear hood that covers a conventional storage area at a rear of a vehicle.

SUMMARY

A hood latch release system according to an exemplary aspect of the present disclosure includes, among other things, a release member within a compartment covered by a hood, a hood latch assembly having a primary latch and a secondary latch that are each moveable between a latched position and an unlatched position, and a release assembly having an electrically powered actuator and a mechanical actuator. The electrically powered actuator and the mechanical actuator are each configured to move the primary latch, the secondary latch, or both from the latched position to the unlatched position. The system further includes a selector assembly having a first lever, a second lever, and a coupling member. The coupling member is configured to transition between a decoupling position and a coupling position. When the coupling member is in the decoupling position, actuating the release member moves the first lever relative to the second lever. The movement of the first lever causes the electrically powered actuator to unlatch the primary latch, the secondary latch, or both. When the coupling member is in the coupling position, actuating the release member moves the first lever to move the second lever. The movement of the second lever causes the mechanical actuator to unlatch the primary latch, the secondary latch, or both.

A further example of the foregoing system includes a coupling actuator that is configured to move the coupling member from the coupling position to the decoupling position when the coupling actuator is powered. The coupling actuator is biased to a position that holds the coupling member in the coupling position such that coupling member is moved to the coupling position when the coupling actuator is not powered.

In a further example of any of the foregoing systems, the first and second lever are moveably coupled when the coupling member is in the coupling position such that pivoting the first lever causes the second lever to pivot. The first and second lever are moveably decoupled when the coupling member is in the decoupling position such that pivoting the first lever causes the first lever to pivot relative to the second lever.

In another example of any of the foregoing systems, the coupling actuator is a bistable actuator.

In another example of any of the foregoing systems, the coupling actuator is spring-biased to a position that holds the coupling member in the coupling position such that coupling member is moved to the coupling position when the coupling actuator is not powered.

Another example of any of the foregoing systems includes a powered switch that is configured to transition in response to movement of the first lever and, when powered, initiate the electrically powered actuation of the release assembly.

Another example of any of the foregoing systems includes a control module. The powered switch is configured to initiate the electrically powered actuation of the release assembly by communicating a signal to the control module. The control module is configured to command the electrically powered actuator to unlatch the primary latch, the secondary latch, or both in response to the signal.

In another example of any of the foregoing systems, the switch is a microswitch.

In another example of any of the foregoing systems, when the coupling member is in the decoupling position, actuating the release member moves the first lever relative to the second lever. The movement of the first lever causing the electrically powered actuator to pull a release cable to unlatch one of the primary latch or the secondary latch. The movement of the first lever further causing the electrically powered actuator to pull the release cable a second time to unlatch the other of the primary latch or the secondary latch.

In another example of any of the foregoing systems, when the coupling member is in the coupling position, actuating the release member a first time moves the first lever to move the second lever. The movement of the second lever pulls a release cable to cause causing the mechanical actuator to unlatch one of the primary latch or the secondary latch. Actuating the release member a second time moves the first lever to move the second lever. The movement of the second lever pulls the release cable to cause causing the mechanical actuator to unlatch the other of the primary latch or the secondary latch.

In another example of any of the foregoing systems, the hood is a front hood of a vehicle.

A hood latch release system according to another exemplary aspect of the present disclosure includes a release member within a compartment covered by a hood, a hood latch assembly having a primary latch and a secondary latch that are each moveable between a latched position and an unlatched position, and a release assembly having a first and a second mechanical actuator. The first mechanical actuator is configured to move the primary latch from the latched position to the unlatched position. The second mechanical actuator is configured to move the secondary latch from the latched position to the unlatched position. The system further includes a selector assembly having a first lever, a second lever, and a coupling member. The coupling member is configured to transition between a decoupling position and a coupling position. When the coupling member is in the decoupling position, actuating the release member moves the first lever relative to the second lever. The movement of the first lever causes the first mechanical actuator to unlatch the primary latch. When the coupling member is in the coupling position, actuating the release member moves the first lever and the second lever. The movement of the first lever causes the first mechanical actuator to unlatch the primary latch, the movement of the second lever causes the second mechanical actuator to unlatch the secondary latch.

Another example of the foregoing system includes a first cable connected to the first lever and the first mechanical actuator, and a second cable connected to the second lever and the second mechanical actuator. When the coupling member is in the decoupling position, actuating the release member rotates the first lever relative to the second lever. The rotation of the first lever pulls the first cable to cause the first mechanical actuator to unlatch the primary latch. When the coupling member is in the coupling position, actuating the release member rotates the first lever and the second lever. The rotation of the second lever pulls the second cable to cause the second mechanical actuator to unlatch the secondary latch.

Another example of the foregoing system includes a coupling actuator that is configured to move the coupling member from the coupling position to the decoupling position when the coupling actuator is powered. The coupling actuator is biased to a position that holds the coupling member in the coupling position such that coupling member is moved to the coupling position when the coupling actuator is not powered.

In another example of the foregoing system, the coupling actuator is spring-biased to the position that holds the coupling member in the coupling position.

In another example of the foregoing system, the coupling actuator is configured to move the coupling member from the coupling position to the decoupling position when the coupling actuator is powered and when a vehicle speed is above a threshold speed.

A hood latch release method according to yet another exemplary aspect of the present disclosure includes, among other things, biasing a coupling actuator to a position that holds a coupling member in a coupling position. In the coupling position, the coupling member couples together a first lever and a second lever such that the first and second lever can both be actuated by a release member. The method further includes powering the coupling actuator to overcome the biasing and move the coupling actuator to a position that holds the coupling member in a decoupling position. In the decoupling position, the first lever can be actuated by the release member without actuating the second lever. The method further includes actuating the release member when the coupling member is in the coupling position to release a primary latch from a latched position, to release a secondary latch from a latched position, or both.

Another example of the foregoing method includes, when the coupling member is in the coupling position, actuating the release member once to release both the primary latch and the secondary latch.

Another example of the foregoing method includes, when the coupling member is in the coupling position, actuating the release member a first time to release one of the primary latch or the secondary latch, and actuating the release member a second time to release the other of the primary latch or the secondary latch.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a hood latch assembly that is utilized to secure a vehicle hood in a position covering a storage area of a vehicle. The hood latch assembly can be utilized to secure a front hood in a position covering a storage area (i.e., frunk) at a front of the vehicle. The hood latch assembly can instead be used to secure a conventional rear hood in a position over a conventional storage area (i.e., trunk) at a rear of the vehicle.

A storage area of a vehicle that is large enough to hold a person can be required to, within the storage area, have a means of releasing an associated hood latch assembly. However, the hood latch assembly may also be required to prevent the hood from fully opening when a vehicle is traveling above a predetermined speed, especially a hood latch assembly associated with a front hood.

Figure 1:
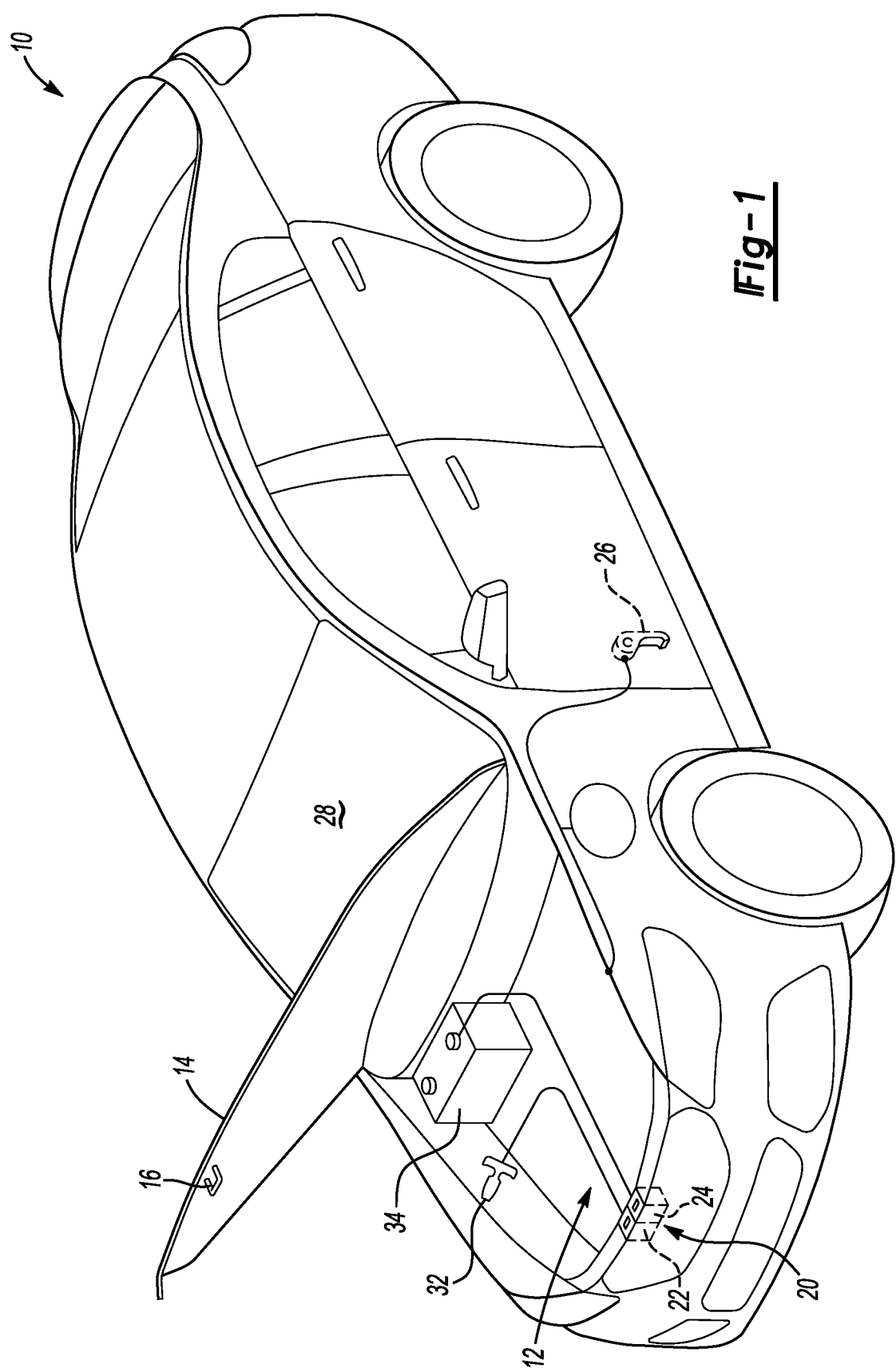
FIG. 1 illustrates a perspective view of an example vehicle having a hood covering a front compartment of the vehicle.

Referring to FIG. 1, a vehicle 10 includes a front compartment 12 that can be covered by a front hood 14. The example vehicle 10 is an electrified vehicle. Electrified vehicles differ from conventional motor vehicles because electrified vehicles can be driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

In particular, in this example, the vehicle 10 is an all-electric vehicle. As the vehicle 10 is an all-electric vehicle, the front compartment 12 does not include an engine. Further, in this example, the front compartment 12 is large enough to hold a person.

The front hood 14 includes a catch 16 that can latch to a hood latch assembly 20 to hold the front hood 14 in a position covering the front compartment 12. The hood latch assembly 20 includes a primary latch 22 and a secondary latch 24. The hood latch assembly 20 can be actuated to release the front hood 14 from a latched position by a release member 26 disposed within a vehicle cabin 28.

Because the front compartment 12 is large enough to hold a person, a person within the front compartment 12 must be able to release the hood latch assembly 20. Additionally, because the front hood 14 is at a front of the vehicle 10, the hood latch assembly 20 must prevent fully releasing the front hood 14 when the vehicle 10 is traveling above a predetermined speed, such as five kilometers-per-hour.

Here, an entrapment handle 32 is disposed within the front compartment 12. Depending on an operational state of the vehicle 10, a person within the front compartment 12 can pull the entrapment handle 32 to release the primary latch 22, or to release both the primary latch 22 and the secondary latch 24.

In the exemplary hood latch assembly 20, releasing the primary latch 22 without releasing the secondary latch 24 does not allow full opening of the front hood 14. Instead, releasing the primary latch 22 permits the front hood 14 to open a slight distance permitting increased airflow to the front compartment 12.

Before the front hood 14 can be fully opened, the secondary latch 24 must also be released. When the vehicle has a power supply 34, such as a 12-Volt accessory battery, that can provide adequate power, electrically controlled actuators could be used to control the release of the primary latch 22, the secondary latch 24, or both. From time to time, the power supply 34 may be depleted such that electronically powered actuation of the primary latch 22 and the secondary latch 24 cannot be accomplished.

Exemplary hood latch release systems of the present disclosure can help to ensure that the front hood 14 can be fully released when the vehicle 10 lacks a power source sufficient to power the release of the primary latch 22 and the secondary latch 24. Further, the exemplary hood latch release systems can prevent full opening of the front hood 14 when the vehicle 10 is traveling above a threshold speed. While described in connection with the front hood 14, the hood latch release systems of this disclosure could be incorporated into a hood latch assembly that holds a rear hood in a closed position over a rear compartment of the vehicle 10.

Figure 2:
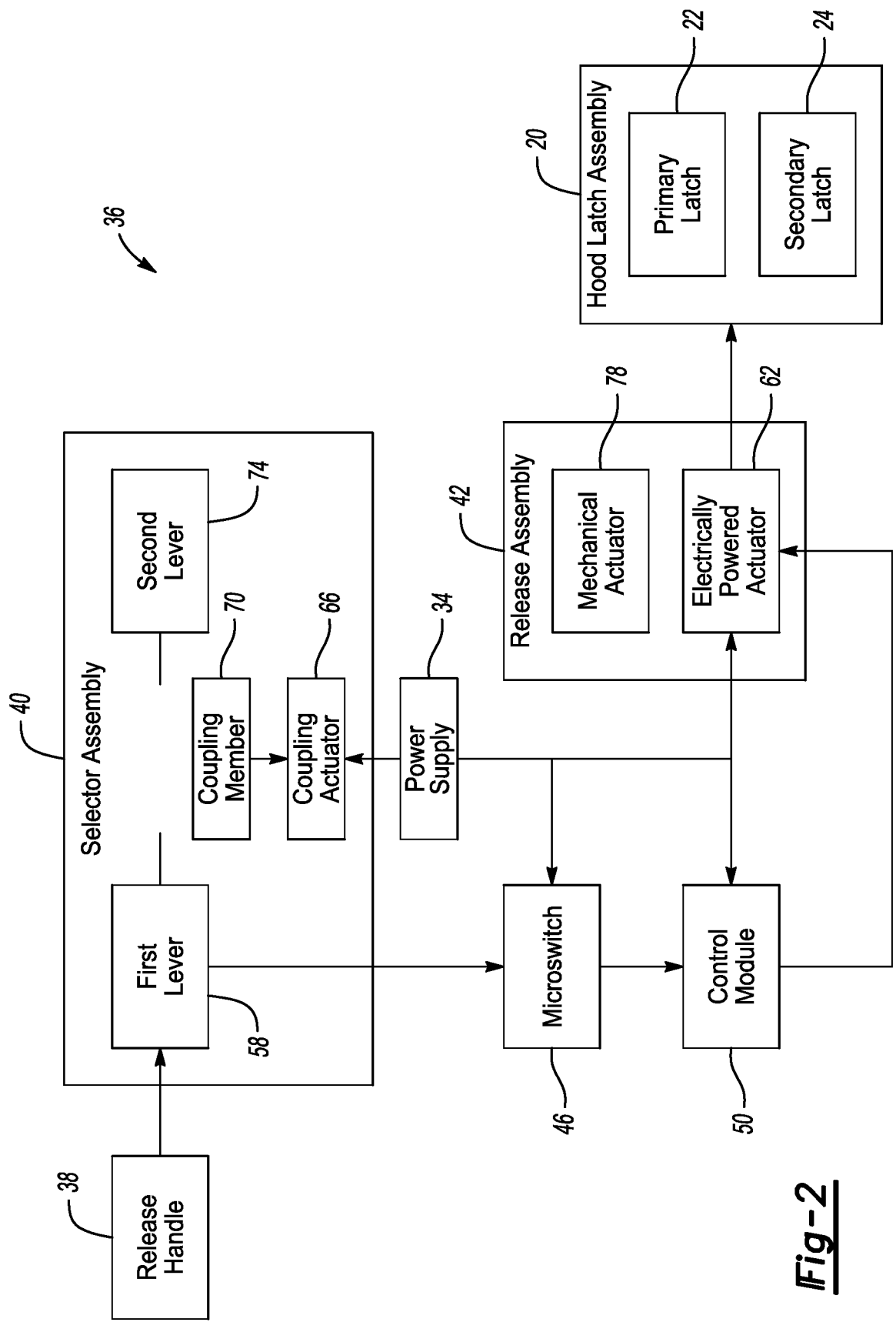
FIG. 2 illustrates a highly schematic view of a hood latch release system utilized within the vehicle of FIG. 1 when an electrically powered actuator is utilized to release latches of a hood latch assembly to release the hood.
Figure 3:
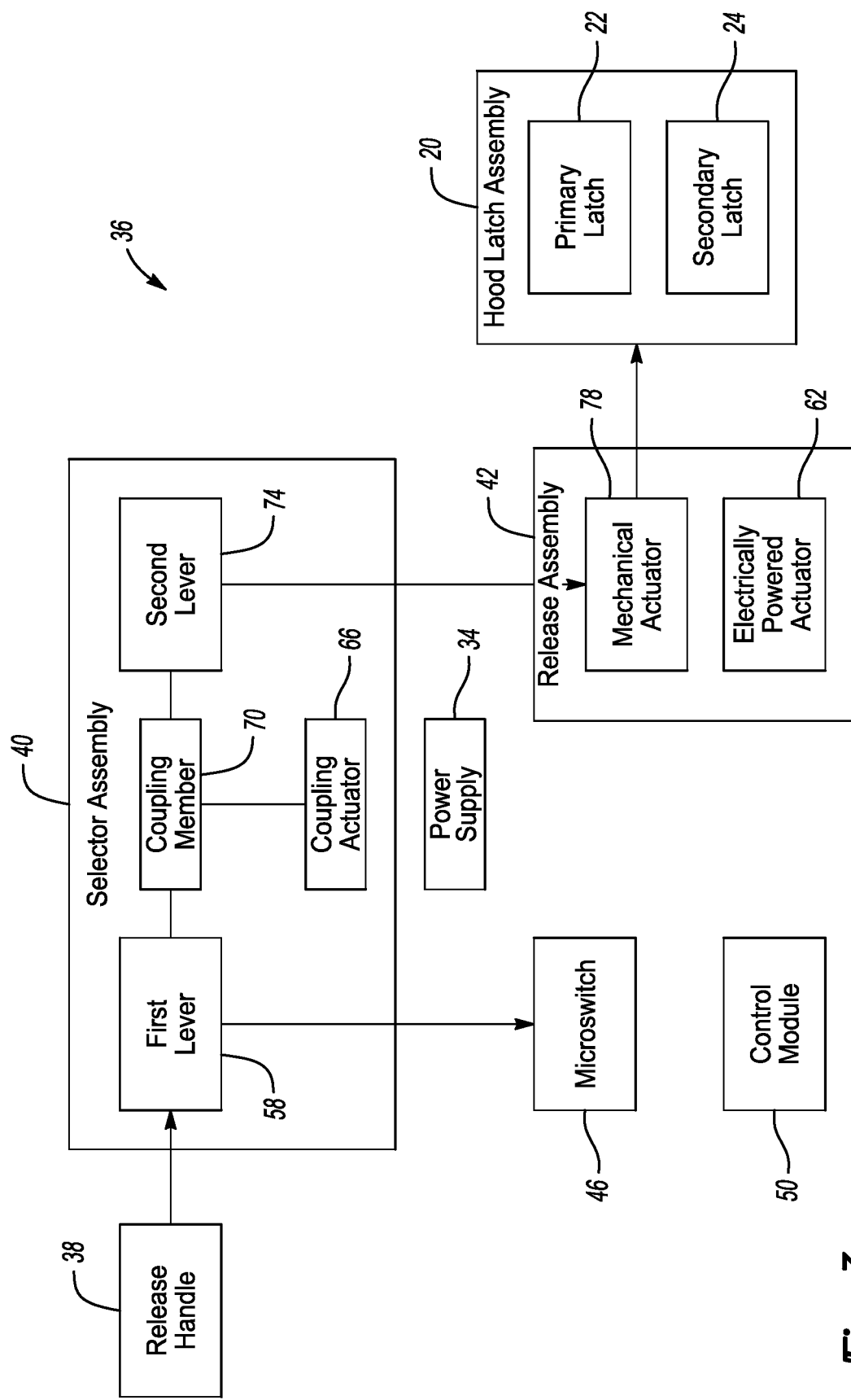
FIG. 3 illustrates the schematic view of FIG. 2 when the vehicle lacks a power supply that can power the electrically powered actuator and thus utilizes a mechanical actuator to release latches of the hood latch assembly.

Referring now to FIGS. 2 and 3 with continued reference to FIG. 1, an exemplary hood latch release system 36 includes a release member 38, a selector assembly 40, a release assembly 42, a microswitch 46, a control module 50, and the power supply 34. The release assembly 42 can be utilized to release the primary latch 22, the secondary latch 24, or both.

In the exemplary embodiment of FIG. 2, the power supply 34 includes adequate energy for powering various components of the hood latch release system 36. To release both the primary latch 22 and the secondary latch 24, that is, move the primary latch 22 and the secondary latch 24 from a latched position to an unlatched position, a person disposed within the front compartment 12 pulls the entrapment handle 32 to actuate the release member 38.

Actuating the release member 38 moves a first lever 58 of the selector assembly 40. The movement of the first lever 58 transitions the microswitch 46, which then communicates a signal to the control module 50. In response to the signal from the control module 50, an electrically powered actuator 62 of the release assembly 42 can release the primary latch 22, the secondary latch 24, or both.

If the vehicle 10 is moving above a threshold speed, the control module 50 can command the electrically powered actuator 62 to release the primary latch 22, but leave the secondary latch 24 in a latched position. This permits the front hood 14 to pop up a slight distance permitting airflow into the front compartment 12 and providing an operator of the vehicle 10 with an indication that a person disposed within the front compartment 12 has pulled the entrapment handle 32.

If the vehicle 10 is moving at a speed below the threshold speed, the control module 50 can command the electrically powered actuator 62 to release both the primary latch 22 and the secondary latch 24 so that the front hood 14 can fully open. Similarly, if the vehicle is stopped, the control module 50 can command the electrically powered actuator 62 to release both the primary latch 22 and the secondary latch 24 so that the front hood 14 can fully open.

In the exemplary embodiment of FIG. 2, the power supply 34 is unable to adequately power various components of the hood latch release system 36. Thus, among other things, the electrically powered actuator 62, the control module 50, and the microswitch 46 cannot reliably be utilized. When the power supply 34 has been depleted to the level of FIG. 3, the vehicle 10 is not moving.

The latch release system 36 incorporates features within the selector assembly 40 and the release assembly 42 to permit a full release of the front hood 14 when the power supply 34 is unable to adequately power various components of the hood latch release system 36.

The selector assembly 40, in the exemplary embodiment, includes a coupling actuator 66, a coupling member 70, and a second lever 74. The coupling actuator 66 can be a bistable actuator. The coupling actuator 66 is configured to move between the coupling position shown in FIG. 3 and the decoupling position shown in FIG. 2.

In the coupling position of FIG. 3, the coupling member 70 movably couples together the first lever 58 and the second lever 74. Thus, actuating the release member 38 moves the first lever 58 and also, through the coupling member 70, moves the second lever 74. Movement of the second lever causes a mechanical actuator 78 of the release assembly 42 to release the primary latch 22, the secondary latch 24, or both.

In an example, a first actuation of the release member 38 causes the mechanical actuator 78, through the second lever 74, to release the primary latch 22. A second actuation of the release member 38 causes the mechanical actuator, through movement of the second lever 74, to release the secondary latch 24. A person within the front compartment 12 can pull the entrapment handle 32 once to cause the first actuation of the release member 38, and a second time to cause the second actuation of the release member 38.

Notably, the coupling actuator 66 is biased to the position of FIG. 3 where the coupling actuator 66 places the coupling member 70 in the coupling position. In the exemplary embodiment, the coupling actuator 66 can only position the coupling member 70 in the decoupling position of FIG. 2 when the coupling actuator 66 is powered. Thus, when the power supply 34 is fully depleted, a person within the front compartment 12 is able to release the latches of the hood latch assembly 20 manually, which permits the person to move the front hood 14 to the fully open position of FIG. 1 and exit the front compartment 12.

Figure 4:
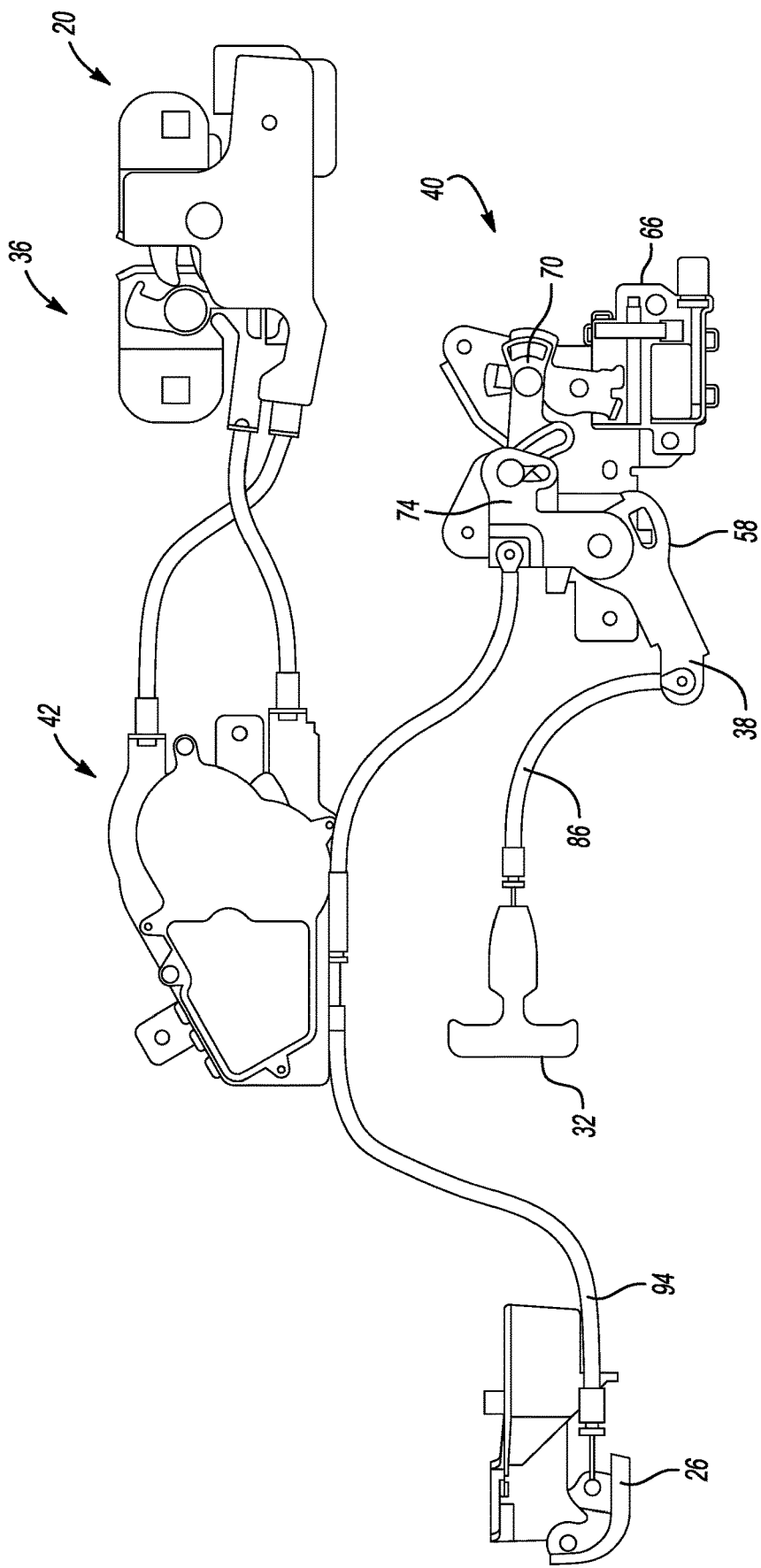
FIG. 4 shows a more detailed view of exemplary components from the schematic views of FIGS. 2 and 3.
Figure 5:
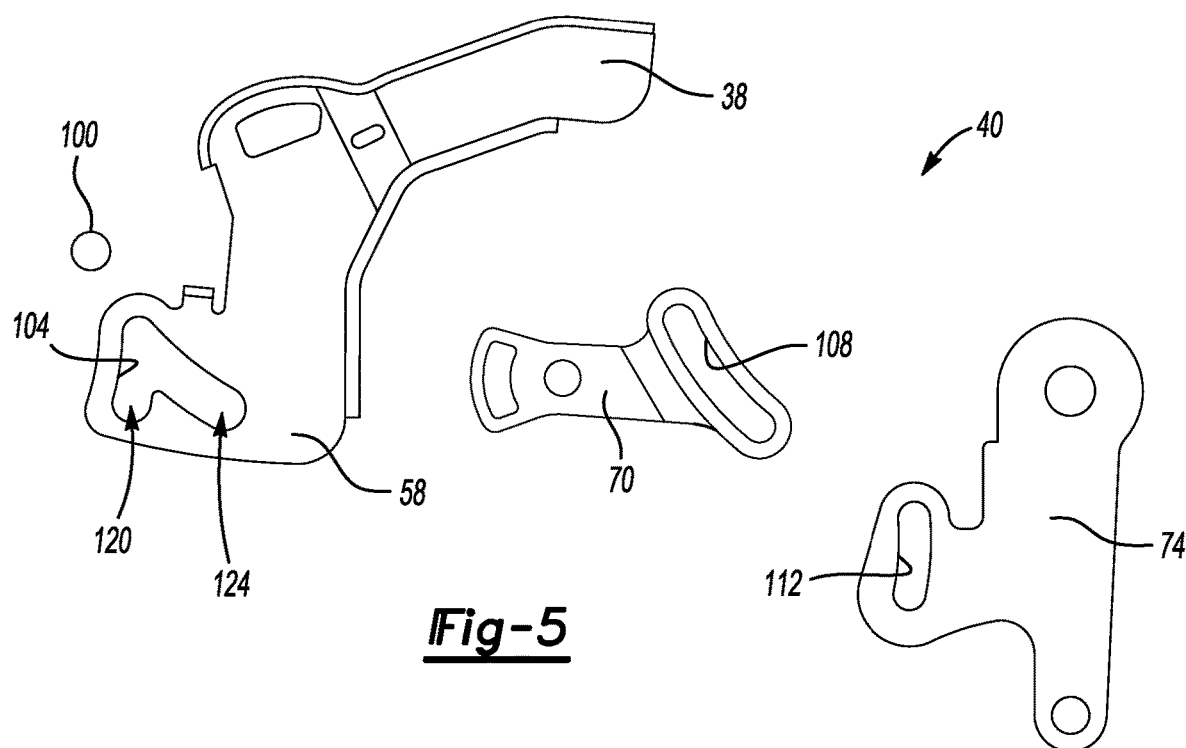
FIG. 5 illustrates selected components from a selector assembly of the hood latch release system of FIG. 4.
Figure 6:
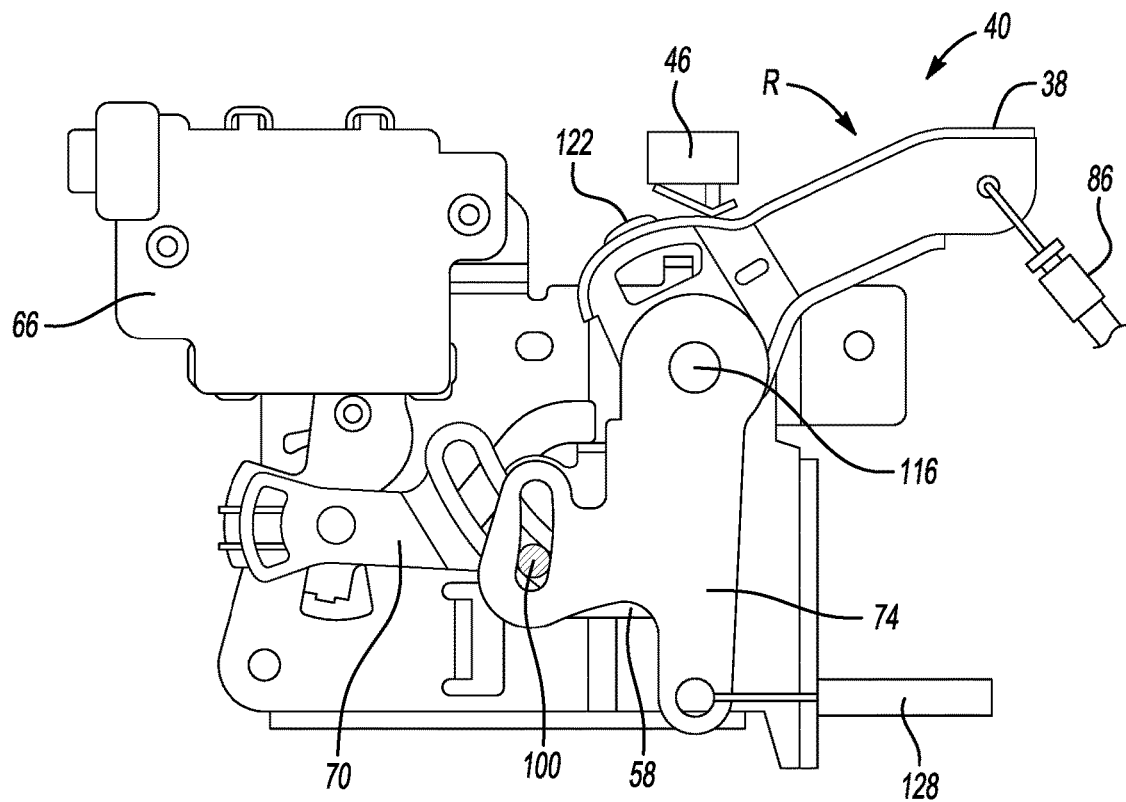
FIG. 6 shows a selector assembly from the system of FIG. 4 when a release member of the selector assembly has not been actuated and a coupling position.
Figure 7:
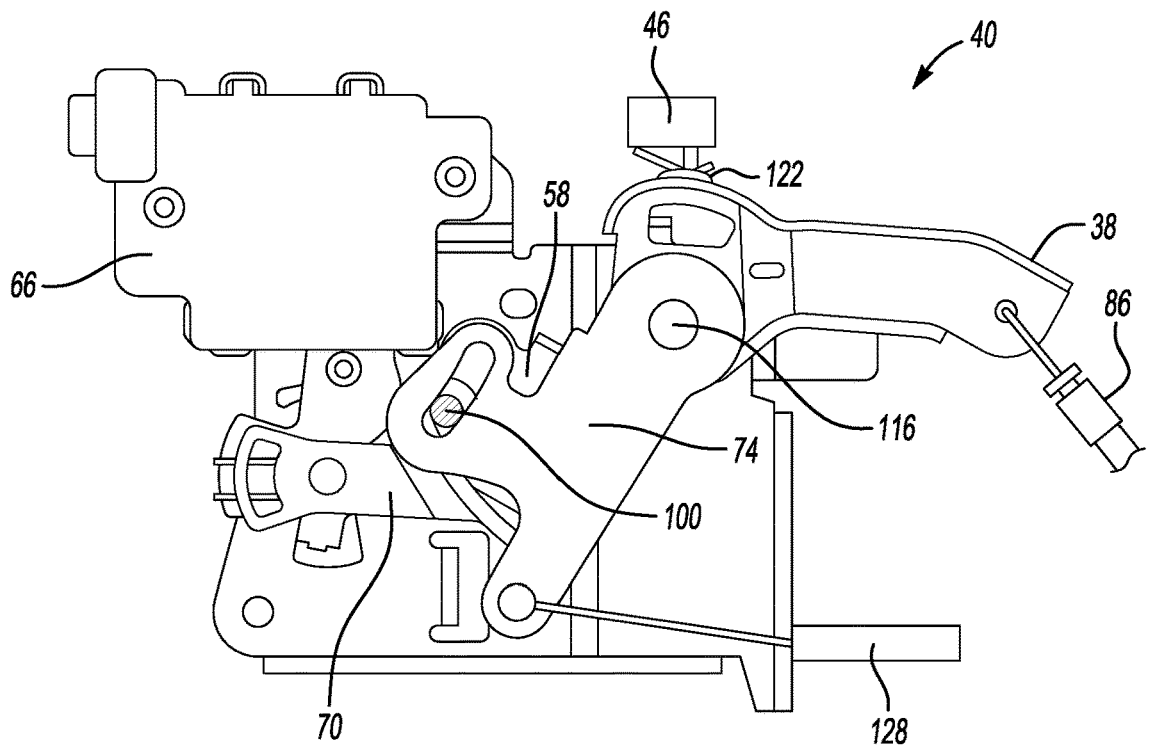
FIG. 7 illustrates the handle release after being actuated when the coupling member is in the coupling position.

FIG. 4 shows more detailed examples of selected components within the hood latch release system 36. With reference to FIG. 4 and continued reference to FIGS. 1-3, the entrapment handle 32 of FIG. 4 is operably connected to the release member 38 by a cable 86. Pulling the entrapment handle 32 pulls the cable 86 to actuate the release member 38, which is directly connected to the first lever 58 in this example.

The hood latch release system 36 can be additionally actuated by the release member 26 within the vehicle cabin 28. A passenger within the vehicle cabin 28 can pull the release member 26 to pull a cable 94 to actuate the release assembly 42.

With reference to FIGS. 5-8, more detailed views of the selector assembly 40 are shown. In this example, the selector assembly 40 includes a pin 100 that extends through a slot 104 of the first lever 58, a slot 108 of the coupling member 70, and a slot 112 of the second lever 74. When the selector assembly 40 is in the coupling position of FIG. 6, rotation of the first lever 58 about a pivot 116 in a direction R causes the first lever 58 to press against the pin 100, which then presses against the second lever 74 to cause the second lever 74 to rotate with the first lever 58 about the pivot 116.

The pin 100 is disposed within a notch 120 of the slot 104 due to the coupling actuator 66 positioning the coupling member 70 in the coupling position. Because the pin 100 is disposed within the notch 120, the pin 100 is not able slide within the slot 104 to the area 124 of the slot 104. Instead, when the pin 100 is within the notch 120, the pin 100 moves with the first lever 58 to move the second lever 74.

Figure 8:
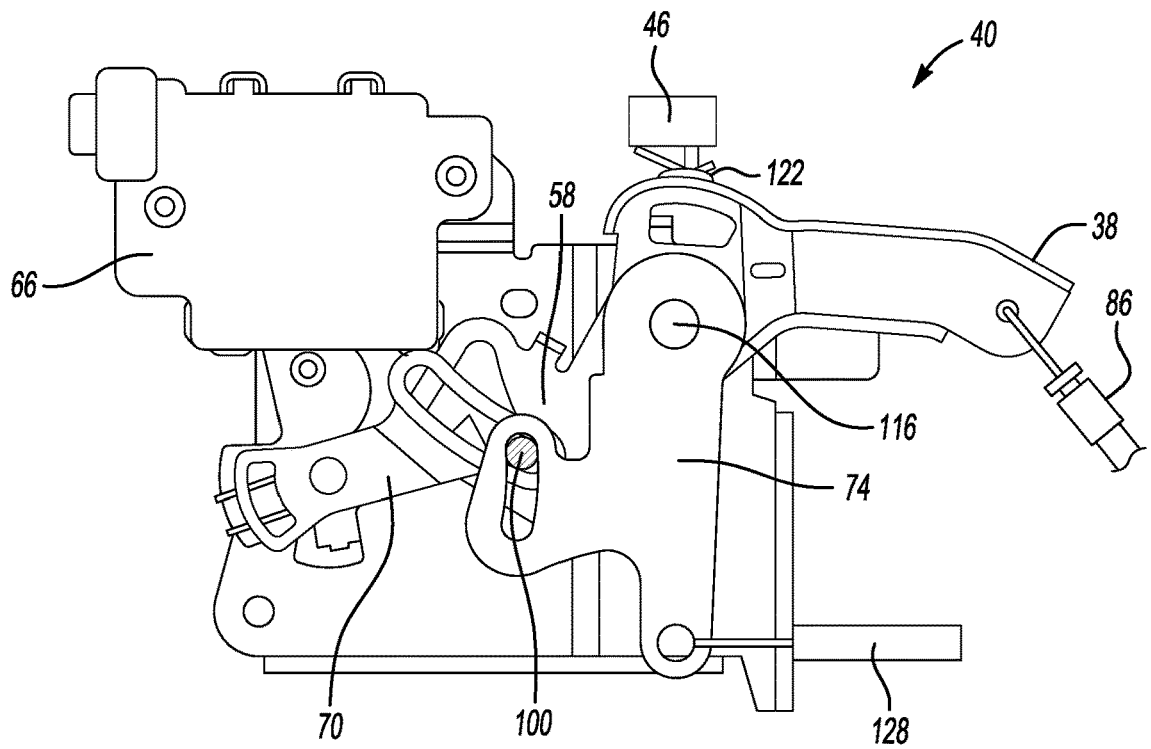
FIG. 8 illustrates the handle release after being actuated when the coupling member is in the decoupling position.

When the coupling actuator 66 is powered, the coupling actuator 66 rotates the coupling member 70 to the position of FIG. 8, which lifts the pin 100 out of the notch 120 and permits the pin 100, when the first lever 58 is rotated in the direction R, to slide within the slot 104 into the area 124. This results in the second lever 74, when the coupling actuator 66 positions the coupling member 70 in the decoupling position of FIG. 8, staying substantially stationary as the first lever 58 is rotated.

When the first lever 58 is rotated to the position of FIG. 8, a contactor 122 of the first lever 58 actuates the microswitch 46. The control module 50 receives a communication indicating that the microswitch 46 has been transitioned. In response, the control module 50 commands the electrically powered actuator 62 (FIGS. 2 and 4) to release the primary latch 22 and the secondary latch 24 if the vehicle 10 is stopped or traveling below a threshold speed. If the vehicle 10 is traveling above the threshold speed, the control module 50 commands the electrically powered actuator 62 to release only the primary latch 22.

When the coupling actuator 66 is not powered, the coupling member 70 is moved to the decoupling position of FIG. 8. When the coupling member 70 is in the decoupling position, rotating the second lever 74 from the position of FIG. 8 to the position of FIG. 6 moves the second lever 74 pulls a release cable 128, which is operably coupled to the mechanical actuator 78 of the release assembly 42. Again, the selector assembly 40 is in the coupling position of FIGS. 5 and 6 when the coupling actuator 66 is not powered, thus, an occupant within the front compartment 12 is able to pull the entrapment handle 32 to rotate the release member 38, which then rotates the first lever 58 and the second lever 74 to pull the release cable 128. Powering the selector assembly 40 when the coupling member 70 is in the coupling position is not required to release both the primary latch 22 and the secondary latch 24 of the of the hood latch assembly 20.

Figure 9:
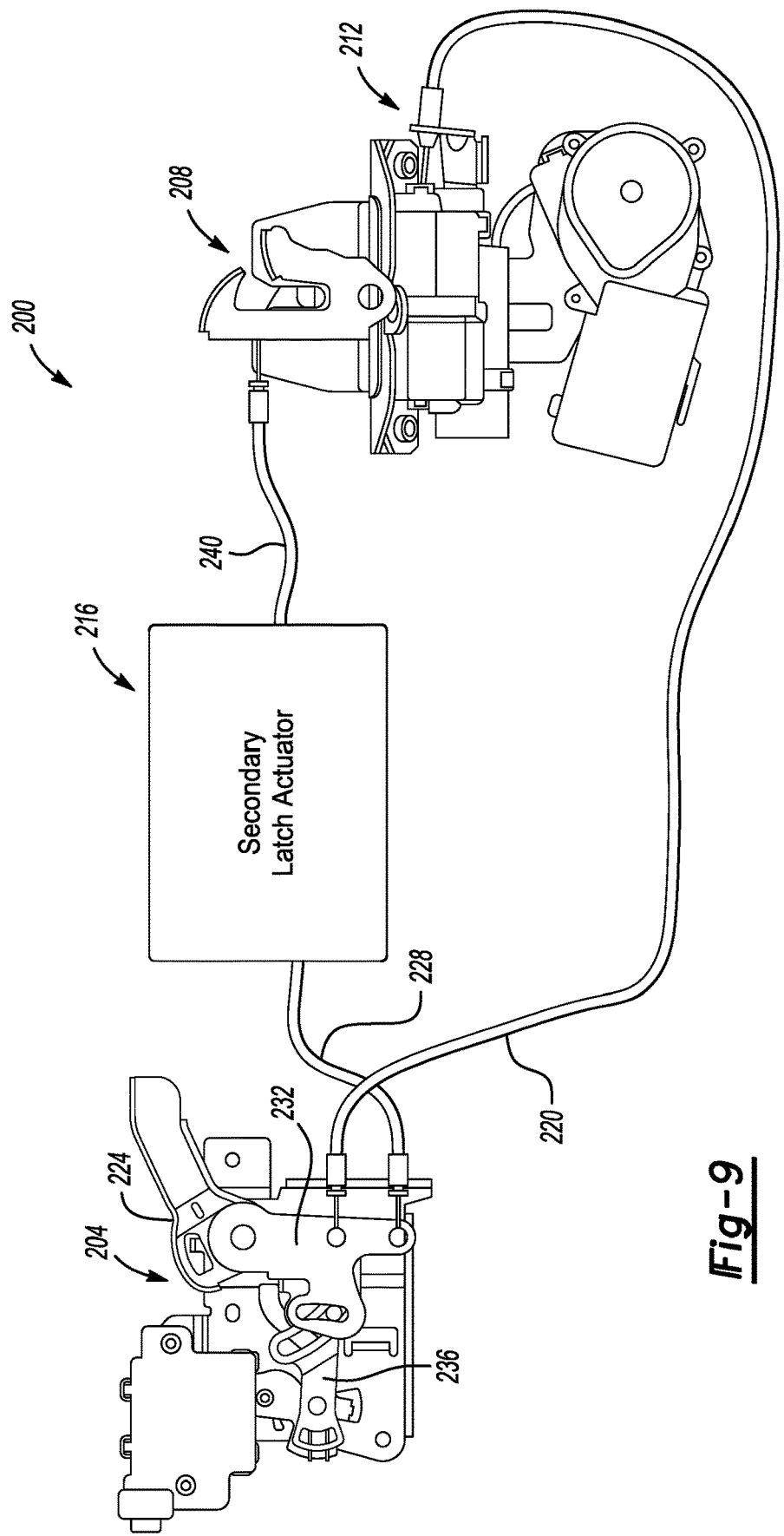
FIG. 9 shows various components of a hood latch release system according to another exemplary embodiment.

With reference now to FIG. 9, another exemplary hood latch release system 200 includes a selector assembly 204, a hood latch assembly 208, a primary latch actuator 212, and a secondary latch actuator 216. The selector assembly 204 includes a first lever 224 and a second lever 232, which operates similarly to the first lever 58 and the second lever 74 of the selector assembly 40 of FIGS. 2-8. However, in the embodiment of FIG. 9, a primary latch release cable 220 is directly connected to the first lever 224 and a secondary latch release cable 228 is directly connected to the second lever 232.

When the selector assembly 204 is not powered and a coupling member 236 of the selector assembly 204 is in the coupling position as shown, rotation of the first lever 224 and the second lever 232 pulls both the release cables 220 and 228. Pulling the primary latch release cable 220 actuates the primary latch actuator 212 to manually release a primary latch of the hood latch assembly 208. Pulling the secondary latch release cable 228 actuates the secondary latch actuator 216 to pull a cable 240, which then manually releases a secondary latch of the hood latch assembly 208.

Figure 10:
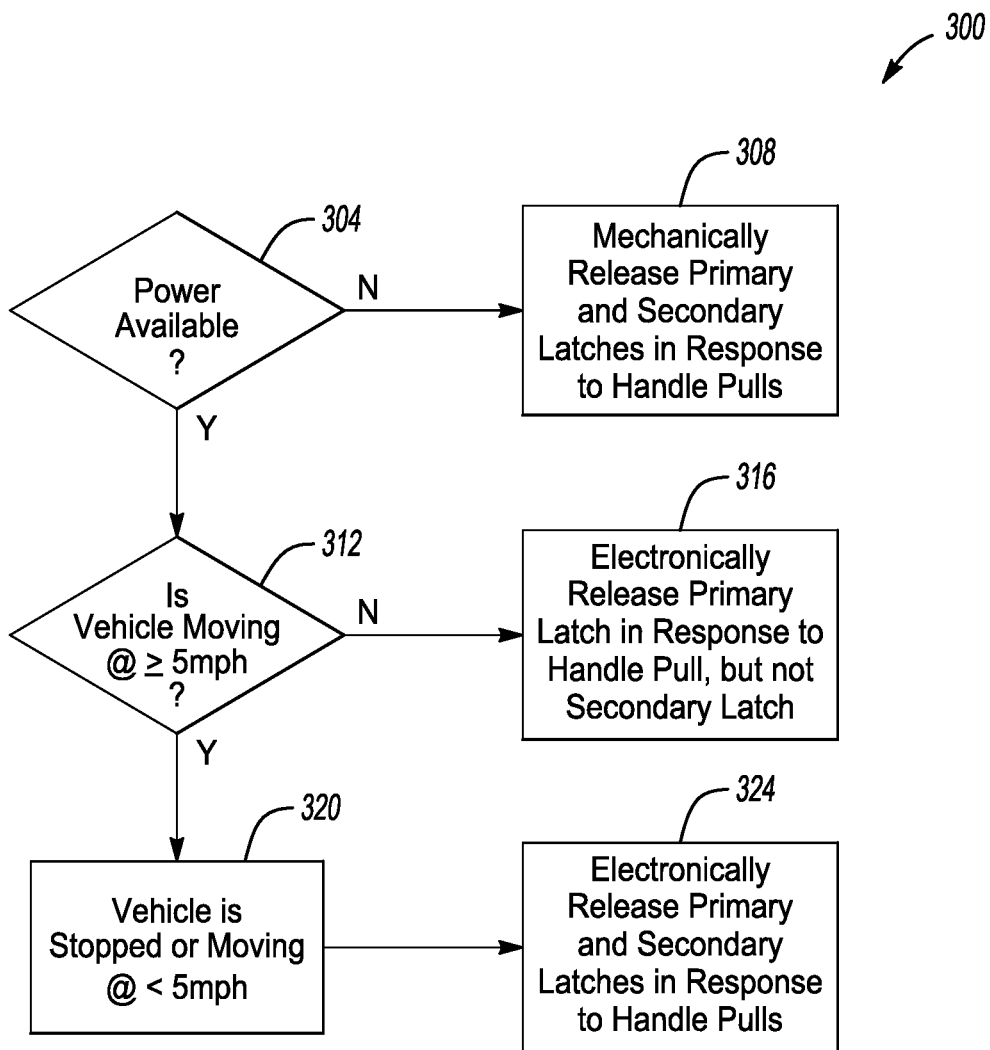
FIG. 10 shows a flow of an exemplary method utilizing the hood latch release system of the FIG. 4 or the FIG. 9 embodiment.

With reference to FIG. 10, a flow of an exemplary hood latch release method 300 begins at a step 304, which determines whether a vehicle has power to power a hood latch release system. If not, the method 300 moves to a step 308 where the system will mechanically release primary and secondary latches in response to pulls of an entrapment handle. If the vehicle has enough power to power the hood latch release system, the method 300 moves to a step 312.

At the step 312, the method 300 assesses whether the vehicle is travelling at a speed that is greater than or equal to a threshold speed—here five kilometers-per-hour. If yes, the method 300 moves to a step 316, which electronically releases a primary latch in response to a pull of the entrapment handle, but does not release a secondary latch in response to a pull of the entrapment handle. If the vehicle is stopped or traveling at a speed less than the threshold speed, the method 300 moves to the step 320. The method 300 then moves to the step 324, which electronically releases the primary latch and the secondary latch in response to at least one pull of the entrapment handle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A hood latch release system, comprising:
   a release member within a compartment covered by a hood;
   a hood latch assembly having a primary latch and a secondary latch that are each movable between a latched position and an unlatched position;
   a release assembly having a first actuator and a second actuator, each configured to move the primary latch, the secondary latch, or both from the latched position to the unlatched position; and
   a selector assembly having a first lever, a second lever, and a coupling member, the coupling member configured to transition between a decoupling position and a coupling position;
   wherein, when the coupling member is in the decoupling position, actuating the release member pivots the first lever relative to the second lever, the pivoting of the first lever causes the first actuator to actuate a first time to unlatch one of the primary latch or the secondary latch, and further causing the first actuator to actuate a second time to unlatch the other of the primary latch or the secondary latch,
   wherein, when the coupling member is in the coupling position, actuating the release member pivots the first lever to pivot the second lever, the pivoting of the second lever causes the second actuator to unlatch the primary latch, the secondary latch, or both, wherein the first and second lever are pivotally coupled when the coupling member is in the coupling position such that the pivoting the first lever causes the second lever to pivot, and wherein the first and second lever are pivotally decoupled when the coupling member is in the decoupling position such that pivoting of the first lever causes the first lever to pivot relative to the second lever.

2. The hood latch release system of claim 1, further comprising a coupling actuator, the coupling actuator configured to move the coupling member from the coupling position to the decoupling position when the coupling actuator is powered, the coupling actuator is biased to a state that holds the coupling member in the coupling position such that coupling member is moved to the coupling position when the coupling actuator is not powered.

3. The hood latch release system of claim 1, wherein the coupling actuator is a bistable actuator.

4. The hood latch release system of claim 1, wherein the coupling actuator is spring-biased to a state that holds the coupling member in the coupling position such that coupling member is moved to the coupling position when the coupling actuator is not powered.

5. The hood latch release system of claim 1, further comprising a powered switch, the powered switch is configured to transition in response to pivoting of the first lever, and when the powered switch is transitioned, the first actuator is caused to unlatch the primary latch, the secondary latch, or both.

6. The hood latch release system of claim 5, further comprising a control module, the powered switch is configured to cause the first actuator to unlatch the primary latch, the secondary latch, or both by communicating a signal to the control module.

7. The hood latch release system of claim 5, wherein the powered switch is a microswitch.

8. The hood latch release system of claim 1, wherein, when the coupling member is in the coupling position, actuating the release member a first time pivots the first lever to pivot the second lever, the pivoting of the second lever pulls a release cable to cause the second actuator to unlatch one of the primary latch or the secondary latch, and, actuating the release member a second time pivots the first lever to pivot the second lever, the pivoting of the second lever pulls the release cable to cause the second actuator to unlatch the other of the primary latch or the secondary latch.

9. The hood latch release system of claim 1, wherein the hood is a front hood of a vehicle.

10. The hood latch release system of claim 1, wherein the first actuator is an electrically powered actuator, and the second actuator is a mechanical actuator.

* * * * *